United States Patent [19]

Kopecky

[11] Patent Number: 5,011,091
[45] Date of Patent: Apr. 30, 1991

[54] CELLULOSE FIBERIZATION APPARATUS

[75] Inventor: Ivyl D. Kopecky, Ypsilanti, N. Dak.

[73] Assignee: Haybuster Manufacturing Inc., Jamestown, N. Dak.

[21] Appl. No.: 392,742

[22] Filed: Aug. 10, 1989

[51] Int. Cl.⁵ .............................................. B02C 7/06
[52] U.S. Cl. ................................ 241/259.1; 241/261.3
[58] Field of Search .................... 241/244, 250, 259.1, 241/259.2, 259.3, 261.2, 261.3

[56] References Cited

U.S. PATENT DOCUMENTS

| | | | |
|---|---|---|---|
| 1,496,613 | 6/1924 | Asbury | 241/259.3 |
| 2,654,295 | 10/1953 | Sutherland | 241/296 |
| 2,858,990 | 11/1958 | Honeyman | 241/296 |
| 2,982,482 | 5/1961 | Curtis | 241/260 |
| 3,049,307 | 8/1962 | Dalzell, Jr. | 241/296 |
| 3,371,873 | 3/1968 | Thomas | 241/259.1 X |
| 3,741,863 | 6/1973 | Brooks | 162/4 |
| 3,754,714 | 8/1973 | Reinhall | 241/259.1 X |
| 3,790,092 | 2/1974 | Reinhall | 241/259.1 X |
| 3,815,834 | 6/1974 | Gilbert | 241/260 |
| 4,083,503 | 4/1978 | Langdon | 241/259.1 |
| 4,252,279 | 2/1981 | Johansson et al. | 241/27 |
| 4,365,761 | 12/1982 | Danforth | 241/21 |
| 4,586,665 | 5/1986 | Eriksson | 241/259 |
| 4,673,136 | 6/1987 | Bianco et al. | 241/280 |

Primary Examiner—Timothy V. Eley
Attorney, Agent, or Firm—Kinney & Lange

[57] ABSTRACT

A fiberization apparatus for treating cellulose, and particularly paper flakes that have been formed from waste paper that has been ground to a certain particle size, by passing the flakes between the sides of a rotating central disc and a pair of stationary discs on opposite sides of the central disc. The rotating disc and the stationary discs have radially extending teeth that taper in depth from a minimum close to the axis of the discs to a maximum near the outer periphery. The facing edges of the teeth on the rotation and stationary discs closely spaced so that as the paper flakes are forced across the teeth, the flakes are disintegrated into loose fibers and the density of the cellulose material is reduced substantially so that it can be used efficiently for insulation purposes.

11 Claims, 4 Drawing Sheets

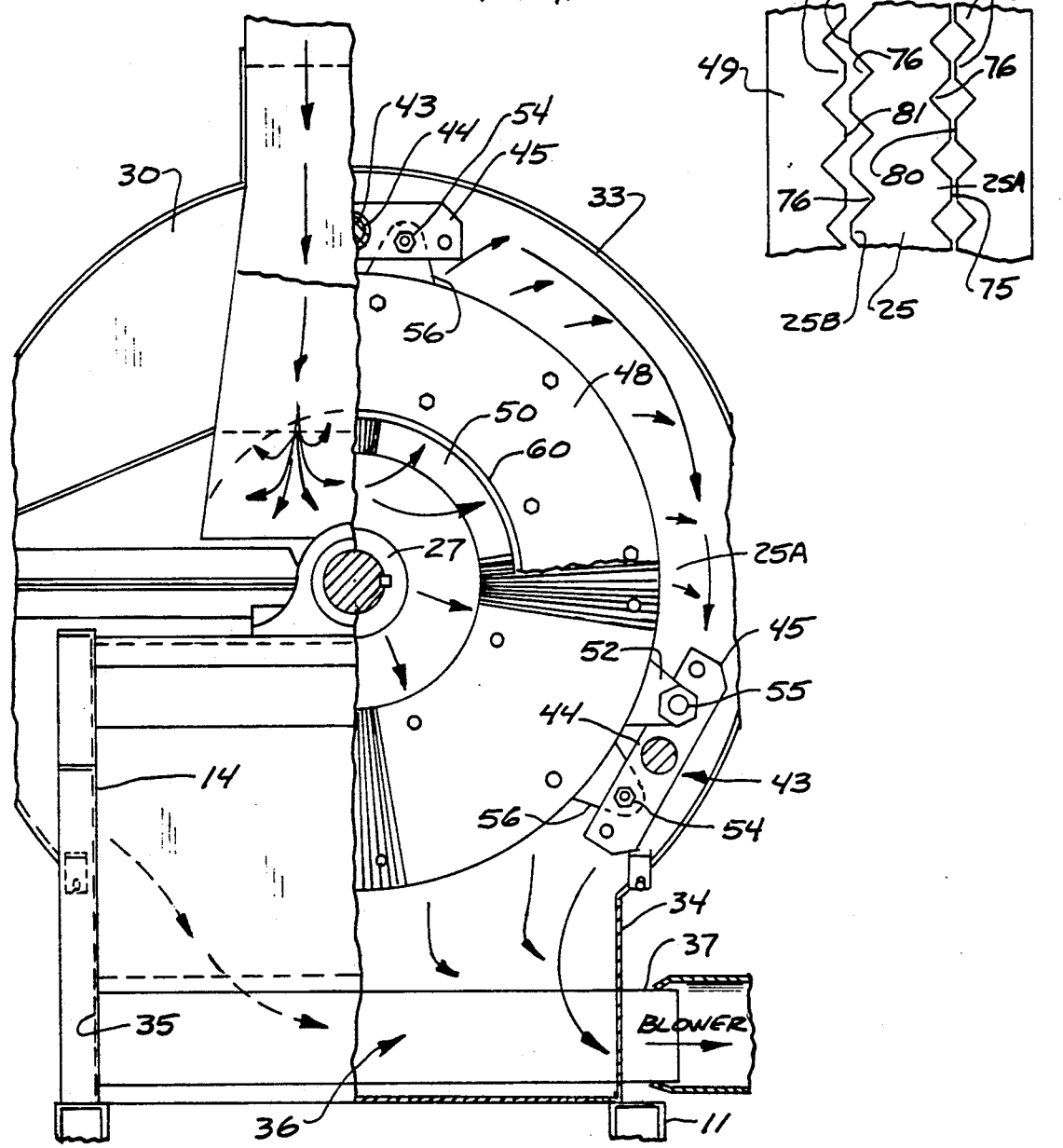

CELLULOSE FIBERIZATION APPARATUS

BACKGROUND OF THE INVENTION

1. Field of the Invention.

The present invention relates to fiberization or refining of cellulose, specifically waste paper, to reduce its density to a level wherein it provides a desirable insulation material.

2. Description of the Prior Art.

Various attempts have been made to refine cellulose, such as wood fibers, in paper making operations. For example, U.S. Pat. No. 4,982,482 shows a double disc refiner that has a central rotating disc, and a pair of stationary discs facing this rotating disc on opposite sides and forming a path so that the cellulose will go outwardly with respect to the axis of the rotor on one face of the rotor, and back in toward the axis on the opposite face of the rotor and then will be discharged.

Additionally, a disc type refiner that is similar in construction is shown in U.S. Pat. No. 3,049,307. A particular arrangement of large grooves for the discs is utilized in Patent '307 for obtaining satisfactory operation.

A refiner apparatus is also shown in U.S. Pat. No. 2,654,295, which relates to a particular arrangement of grooves to obtain a movement of fibers in the grooves themselves to work in refining of paper stock.

U.S. Pat. No. 3,815,834 also shows a disc refiner that includes a peripheral flow retarding ring that has a number of flow dividing ribs for regulating the path of movement of fibers being treated. These discs generally work with a slurry of material used in paper pulp manufacture.

U.S. Pat. No. 4,586,665 shows an apparatus for treating cellulose pulp that provides for adjustments of a pair of screw members that are used for treating the pulp by moving the screws or augers on the interior of the housing in which they are mounted.

U.S. Pat. No. 2,858,990 shows a rotor moving relative to a stator, both of which have teeth. The rotor and stator are used for shredding and treating of fibrous material, such as old paper stock and dry pulp sheets.

However, the efficient handling of dry shredded paper flakes and causing them to be broken down into individual fibers to greatly decrease the bulk density, and thereby making the product much more suitable for insulation, has eluded the workers in the field. The present device provides for very precise adjustment of a central rotor moving between two discs, with facing teeth shaped and spaced so that with the flow path of materials, the paper flakes are reduced essentially to individual fibers and the output product is greatly reduced in density.

SUMMARY OF THE INVENTION

The present invention relates to a fiberization apparatus and process wherein ground paper in the form of small flakes, say in the range up to ½ inch major dimension (diameter or length) are fed into a rotating disc-stator assembly. Due to the path of movement as well as the configuration of the teeth used, the paper flakes are reduced to substantially individual cellulose fibers and discharged from between the discs. This decreases the overall density of the product immensely, and provides for efficient treatment of waste paper so that it can be used for cellulose insulation material.

The spacing between the side surfaces of the rotor disc and the stators or stationary discs can be closely controlled with the present device with very fine adjustments being obtained so that the proper spacing is achieved to permit reducing the paper into its desired form. Additionally the teeth themselves are configured so that they will not wear excessively, but will adequately disintegrate the paper into individual cellulose fibers for operation. The feed of the paper flakes is from both sides of the rotor, through housing walls adjacent the axis, and then radially outward into a housing area. A blower having a vacuum side draws air through the housing for the rotor and transport the light, low density cellulose to its desired location.

BRIEF DESCRIPTION OF THE DRAWINGS

FIG. 4 is a fragmentary outer peripheral view of the rotor and stator assembly enlarged to show the configuration of the mating teeth;

FIG. 5 is a sectional view taken generally along line 5—5 in FIG. 2, with parts in section and parts broken away for showing details; and FIG. 6 is an enlarged sectional view of a spacing adjustment device used with the rotor and stator assembly of the present invention.

DETAILED DESCRIPTION OF THE PREFERRED EMBODIMENTS

Figure 1:
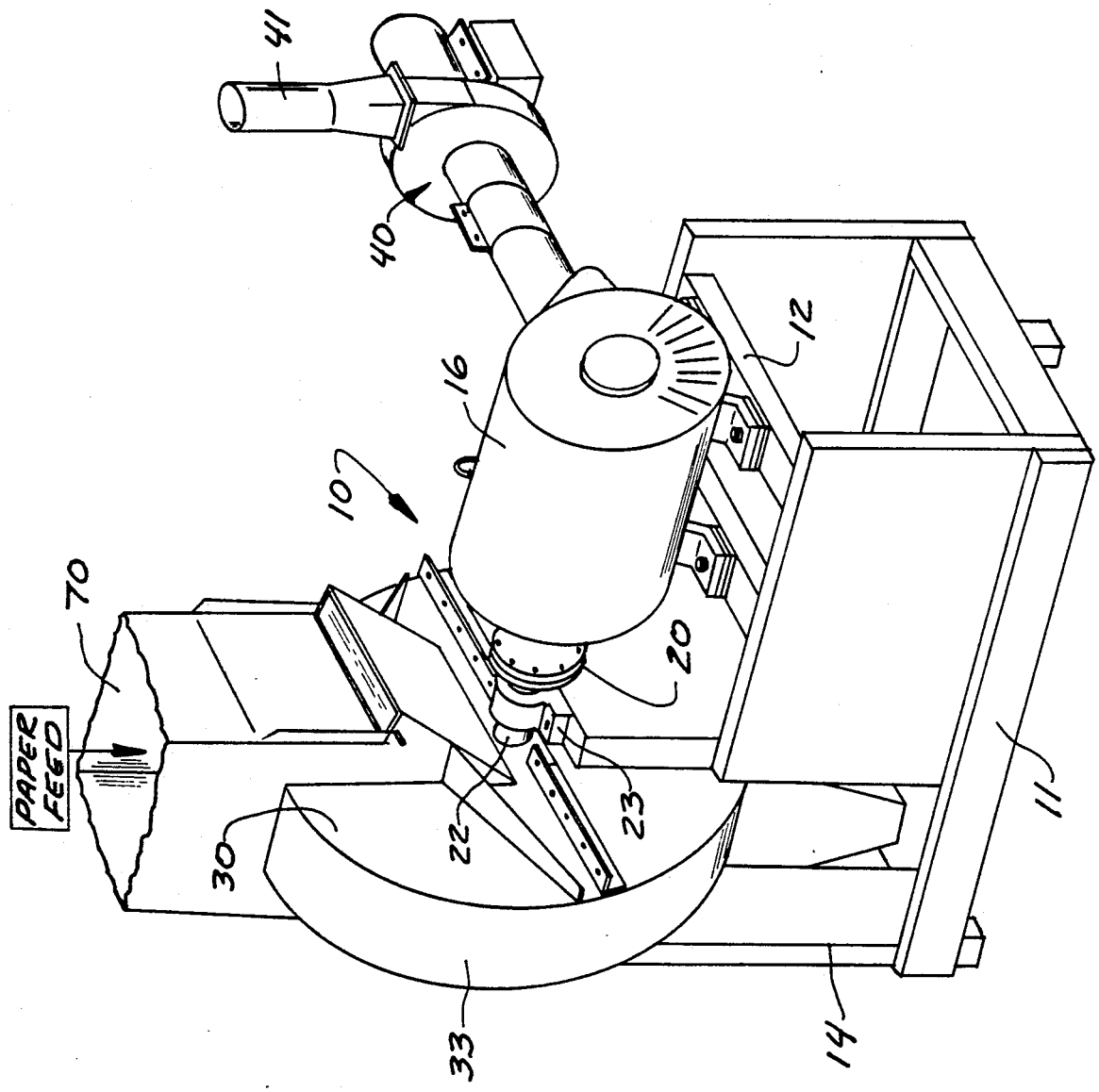
FIG. 1 is a fragmentary perspective view of a fiberization apparatus made according to the present invention.

A fiberization apparatus indicated generally at 10 comprises a frame 11 that has a motor mounting base portion 12, extending laterally of a rotor housing 13 that is also supported on upright frame members 14 on opposite sides of the rotor housing 13. The drive motor 16 is a conventional electric motor having an output shaft which is coupled with a suitable coupling 20 to drive a rotor-stator assembly indicated generally at 21 that is mounted on the interior of the housing 13. The rotor-stator assembly which has a central drive shaft 22. The drive shaft 22 is mounted on suitable bearings 23,23 and is rotated by the motor 16 through the direct drive at the rated motor rpm, for example 1750 rpm. The rotor stator assembly 21 has a main central grinding rotor indicated at 25, which is precisely formed to have toothed surfaces. The teeth will travel in two planes (one on each side) perpendicular to the axis 26 of the shaft 22. The rotor 25 is welded or otherwise suitably attached to a hub 27 that is driven by the shaft 22. The rotor teeth may be cast in removable plate sections fixed to a central disc, but the rotor is considered one piece for purposes of discussion.

The rotor housing 13 has a pair of side walls 30,30 which are spaced apart and are joined together with an outer peripheral wall 33 (see FIG. 5). The peripheral wall 33 is of larger diameter than the rotor and has lower end wall portions 34 and 35 that are between lower sections of the side plates 30, to form a collection plenum 36 at the lower part of the housing.

The collection plenum 36 opens at one end to a tube 37 that is in the end wall 34, and which comprises an outlet tube for the fiberized product. The tube 37 is connected to the low pressure side (particular vacuum side) of a large blower 40 that is shown in FIG. 1. The blower 40 has an outlet stack 41 that is used for discharging the fiberized cellulose at a desired location. Blowers are commonly used for moving cellulose insulation. The inlet side of blower 40 creates a slight negative pressure on the interior of the housing 30, and in the plenum chamber 36. This negative pressure also helps in maintaining the flow of material from the inlet of housing 30 to the outlet. There are three cross bar support assemblies 43 positioned inside the housing 13 and extending between the side walls 30,30. The cross bar assemblies 43 include rigid cross shafts 44, and arms 45 which are at right angles to the axes of the shafts 44. The arms 45 are fixedly attached to the shafts and project outwardly in opposite directions from the shafts. The arms 45 are to the exterior of the periphery of the rotor-stator assembly 21, and thus to the extension of the outer periphery of the rotor 25.

Arms 45 are used for supporting a pair of fixed stator discs 48 and 49, respectively, which are part of the assembly 21. The stator discs 48 and 49 are heavy, generally flat plates that have central openings shown at 50 and 51, respectively, that surround the hub 27, and which are of sufficient size so that they will permit paper flakes to be introduced to the side surfaces of the rotor 25. The stator discs have teeth on the sides facing the rotor.

The stationary stator disc 48 has three radially extending ears 52 thereon, which have internally threaded bores. The ears 52 are spaced evenly around the periphery. A sleeve 53 is threaded through a bore in each of the ears 52, and each sleeve 53 is held in place with a suitable bolt 54 that clamps the sleeve tight against one end of a respective arm 45. Each threaded sleeve 53 can be adjusted so when one end abuts against the respective arm 45 the ears 52 precisely position the stator disc 48 at a desired axial location along axis 26. A lock nut 55 can be used for locking the sleeve 53 in place. The bolt 54 for each sleeve 53 is tightened down with a suitable nut at the outer end, and it should be noted that the outer end of each sleeve 53 can have wrench flats or fittings thereon so that the sleeve can be threaded relative to the ear it is mounted in for precise positioning of the associated stator disc.

The stationary stator disc 49 has ears 56 thereon, which are threaded to receive threaded sleeves 53, held with bolts 54, to securely hold the stator disc 49 properly positioned at three annularly spaced locations. Thus both stator discs can be precisely positioned axially. Each arm 45 has provisions for mounting one stator disc at one end of the arm and the other stator disc at the other end.

Sleeve sections 60 and 61 are held welded to the outside of stator discs 48 and 49 and align with openings 50 and 51. The outer ends of the sleeve sections slide within annular bands 62 and 63, respectively, and are mounted on the respective side walls 30. The sleeves 60 and 61 form chopped paper flake guide chutes coming from openings 64 and 65, in the opposite side walls 30. The openings 64 and 65 are the infeed openings for paper flakes. The paper flakes are provided from a feed hopper 70 that has a divider so that part of the flakes being fed from storage go through a passageway 72, and part through a passageway 73. The passageways 72 and 73 lead to the openings 64 and 65, respectively. The paper flakes are carried in an air current and a slight negative pressure created by the blower 40 carries these flakes into the openings 64 and 65, and through the openings 50 and 51. Since the rotor 25 is solid, the flakes then must pass outwardly toward the outer edge of the rotor-stator assembly 21.

Figure 2:
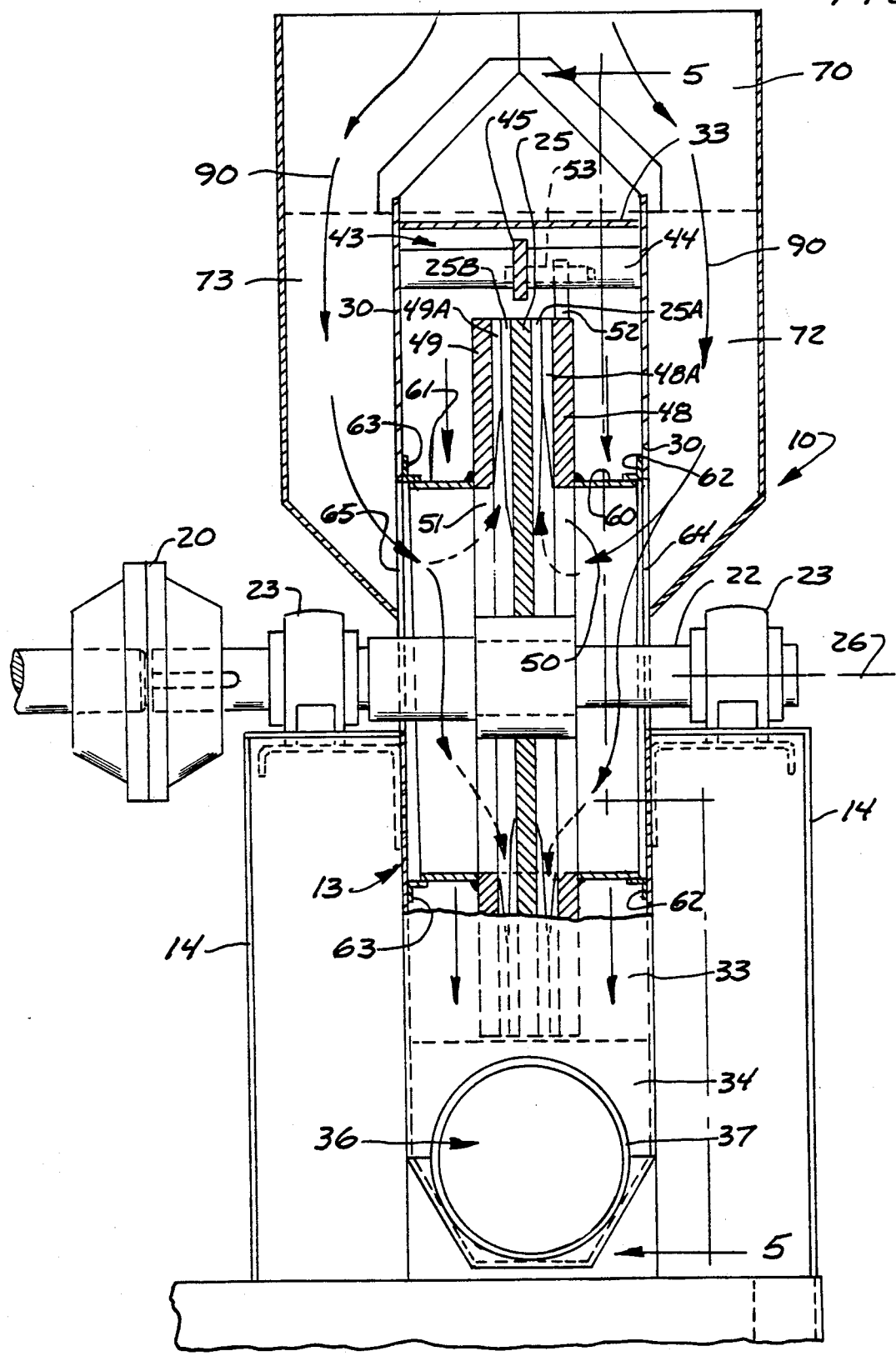
FIG. 2 is a sectional view through a housing and disc assembly, with parts in section and parts broken away.
Figure 3:
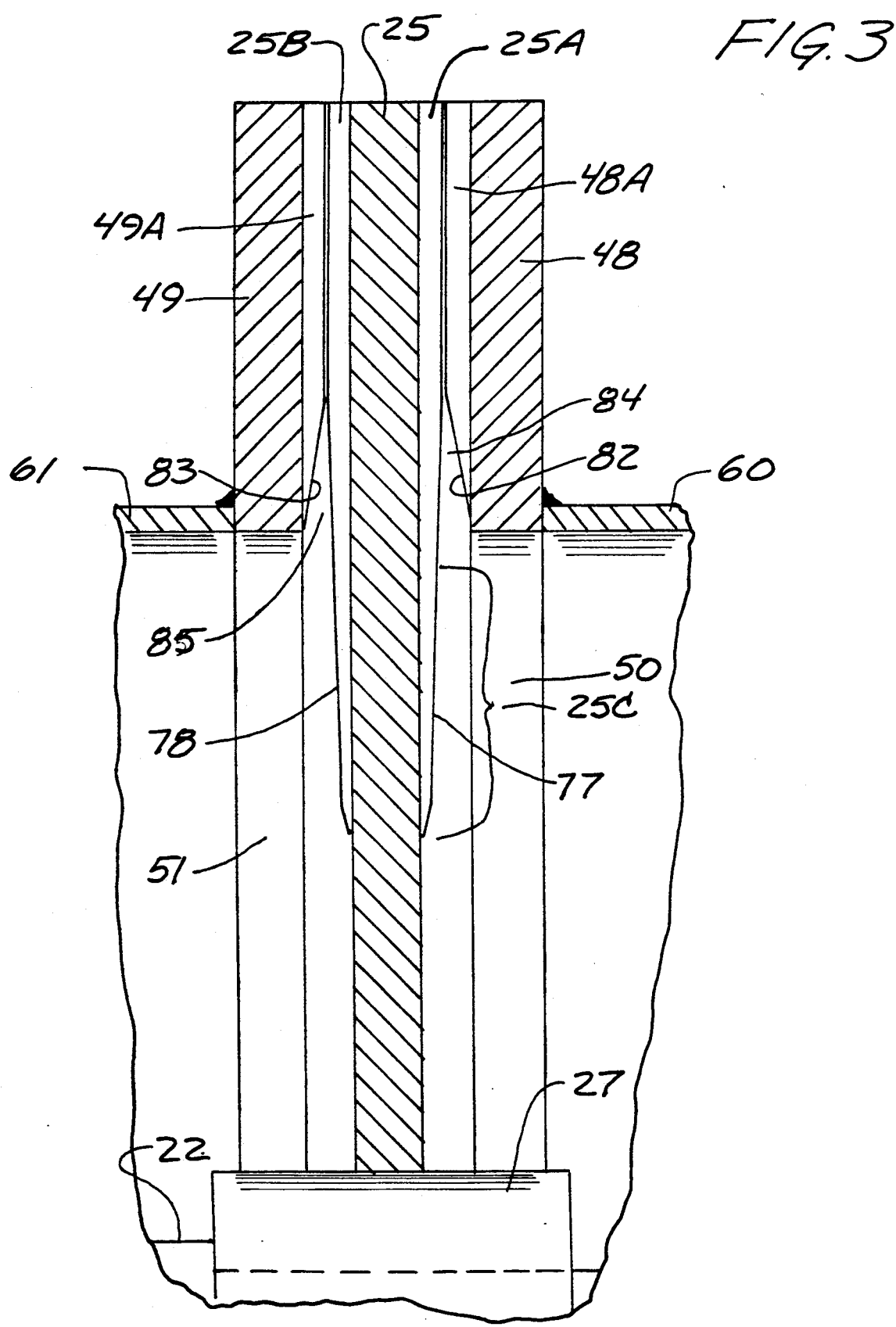
FIG. 3 is an enlarged fragmentary sectional view showing the configuration of the construction of the teeth of the rotor and stators of the present invention.

The rotor 25 has radially extending, tapered teeth on both of its outer side surfaces. As can be seen in FIG. 2 and also in FIGS. 3 and 4, the teeth are cast and can be formed in part annular sections, which are integral with the rotor 25. The teeth shown at 25A and 25B on opposite sides of the rotor 25 have flat outer end surfaces, as can be seen in FIG. 4 and which are indicated at 75. The ends of the teeth indicated at 75 form planes that are perpendicular to the axis 26 of the shaft 22, so that the rotor rotates in a true path and there is little runout.

The teeth 25A and 25B have the flat outer surface 75 for a radial length adjacent the outer periphery, and then taper inwardly toward the central plane of the rotor 25, that is toward the roots of the grooves 76, which form the teeth along sections indicated at 77 and 78. (See FIG. 3). The teeth 25A and 25B extend radially inwardly farther than the outer edges of the openings 50 and 51, so that the paper material entering through the openings 50 and 51 will engage the inner end portions of the teeth 25A and 25B. The stationary stator discs or plates 48 and 49 also have teeth indicated at 48A and 49A respectively, facing the rotor and these teeth likewise have end surfaces 80 and 81. Surfaces 80 and 81 lie on planes that are held perpendicular to the axis of rotation of the shaft 26 by adjustments of the sleeves 53 relative to the ears 52. The teeth 48A and 49A are uniform depth along the surfaces 80 and 81 near the outer peripheral portions thereof. The stator teeth have tapered sections 82 and 83, that taper back away from the rotor in direction toward the axis 26 to the edges of openings 50 and 51. Thus, there is a tapering space 84 between the tapered surfaces 78 and 82, on one side of the rotor 25, and a tapering space 85 between the surfaces 78 on the teeth 25B and the surface 83. This spaces taper to become more narrow in direction radially outward from the axis 26.

Because the stator plates are precisely formed so that the end surfaces of the teeth indicated at 80 and 81 lie on planes, they can be adjusted to be closely spaced relative to the surfaces 75 on the teeth 25A and 25B. Very little clearance between the rotor and the stator discs is provided.

The in coming paper flakes will move through the passageways 72 and 73 as indicated by the arrows 90, and then will enter the housing 30 through the openings 64 and 65. The inner end portions of the rotor teeth, bracketed at 25C in FIG. 3, will engage the in coming flakes. Because of the slight negative pressure being formed around the outer periphery of the rotor 25, and stator discs 48 and 49, and the action of teeth sections 25C the paper flakes will tend to flow radially outward. The tapered portions of the teeth on the rotor will engage the flakes, because the tapered portions align with the openings 50 and 51, and as the paper flakes move radially out, the flakes will be forced into the tight clearance between the flat tooth surfaces 75 on opposite sides of the rotor teeth and the surfaces 80 and 81 on the stator disc teeth, and the paper will be disintegrated and substantially reduced to individual fibers. The tapered openings 84 and 85 aid in feeding the material into the teeth, so that it is adequately disintegrated as it passes through the very close clearances between the flat surfaces of the teeth adjacent the outer peripheries of the rotor and stator discs.

The pulverized material exits the outer periphery of the rotor and stator assembly 21, and the fiberized cellulose flows down around the outside of the stator discs into the plenum chamber 36 and out through the pipe connection 37 to the blower 40.

The secure and positive support of the stator discs, and the precise adjustment possible so that the clearances can be adjusted, results in fiberization or disintegration so that the cellulose is broken down into its individual fibers.

The clearance between the rotating central disc and the fixed discs is in the range of 0.005 inches to 0.060 inches. Preferably with waste new print, the clearance will be between 0.005 and 0.025 inches. The stator discs can be adjusted closer to or farther away from the rotor disc.

The closer the discs are set together, the more complete the fiberization process will be, and the lower the settled density of the final product will be. Exhaust outlet or plenum 36, and the blower 40 can be conventional conveyors for cellulose materials.

The paper flakes are made from good quality newsprint, cardboard, or other nonslick wastepaper, so that recycling of paper is greatly enhanced. Densities can be reduced from about 1.5 pounds per cubic foot to approximately one pound per cubic foot by the fiberization process. The fiberized cellulose insulation, after processing with the present device, will fill approximately 30% more volume than cellulose insulation produced by other methods.

The tapered teeth on the rotor and stator provide for good feeding. The ability to adjust the spacing precisely and hold the stator discs very parallel to the planes of the outer end of the teeth on the rotor are important factors in obtaining the desired results.

Although the present invention has been described with reference to preferred embodiments, workers skilled in the art will recognize that changes may be made in form and detail without departing from the spirit and scope of the invention.

What is claimed is:

1. A fiberization apparatus for breaking waste paper into fibers comprising a housing, a rotor disc mounted in said housing for rotation about an axis, at least one stator disc mounted in said housing adjacent one side of said rotor disc, said rotor disc having a plurality of teeth formed in at least the one side surface thereof said teeth extending generally radially outward to an outer periphery edge, and said stator disc having a plurality of teeth formed in the surface thereof that faces the rotor, said stator disc having a material feed opening in the center thereof defining a periphery spaced outwardly from the axis of rotation of the rotor, and the teeth on the rotor disc extending inwardly toward the axis of rotation so that the opening on the stator disc leaves a portion of the teeth on the rotating disc exposed.

2. The apparatus as specified in claim 1 wherein said teeth on said rotor taper axially outward to a maximum dimension in direction outwardly from the axis of rotation of the rotor, to form a tapering chamber extending radially outward from the axis of rotation between the stator disc and the rotor.

3. The apparatus as specified in claim 2 wherein the teeth on the rotor have end portions adjacent the outer periphery thereof that are formed to comprise flat surface portions that lie along a common plane perpendicular to the axis of rotation of the rotor.

4. The apparatus as specified in claim 3 wherein the teeth on the stator disc have outer end portions that form flat surfaces that lie on a common plane perpendicular to the axis of rotation of the rotor.

5. The apparatus as specified in claim 1 and support means mounted in annularly spaced locations around the periphery of the stator disc, and fixed to said housing, said support means including means for supporting the stator disc at its outer periphery.

6. The apparatus as specified in claim 5 wherein said support means includes means for adjusting the position of the stator disc in direction along the axis of rotation of the rotor disc.

7. The apparatus of claim 1 wherein there are a pair of stator discs, one positioned on each side of the rotor disc and the rotor disc having teeth on both of the side surfaces thereof.

8. The apparatus of claim 7 and support means mounted on the housing at annularly spaced positions, said support means comprising shaft members spaced outwardly from the periphery of the rotor and stator discs and fixed to the housing, the shaft members extending generally parallel to the axis of rotation of the rotor, each shaft having an arm thereon extending on opposite sides of the shaft, each of the stator discs having a separate peripheral ear corresponding to each shaft and means for connecting the ears of a first stator disc to first ends of the arm and for connecting the ears of a second stator disc to second ends of the arms.

9. The apparatus of claim 8, wherein the means for connecting comprises a separate sleeve thereby mounting in each respective ear and operable for threadably adjusting the position of the stator discs in directions along the axis of rotation of the rotor.

10. The apparatus of claim 7 and means for feeding paper material through an opening in the center of both stator discs.

11. An apparatus for breaking waste paper into fibers comprising a housing, a rotor disc mounted in said housing for rotation about an axis, at least one stator disc mounted in said housing adjacent one side of said rotor disc, said rotor disc having a plurality of teeth formed in at least one side surface thereof, said teeth extending generally radially outward to an outer periphery edge, and said stator disc having a plurality of teeth formed on the surface thereof that faces the rotor, said stator disc having a material feed opening in the center thereof defining a periphery spaced outwardly from the axis of rotation of the rotor, and the teeth on the rotor disc extending inwardly toward the axis of rotation so that the opening on the stator disc leaves a portion of the teeth on the rotating disc exposed, and the teeth on the rotor disc and the stator disc having portions adjacent the outer periphery of the discs which have flat outer end surfaces, the end surfaces of the teeth at the outer periphery portions of the stator disc and rotor disc, respectively, lying on a place perpendicular to the axis of rotation of the rotor, and said stator disc being mounted for adjustment toward and away from the one side surface of the rotor disc.

* * * * *